(12) United States Patent
Dubois et al.

(10) Patent No.: US 10,814,779 B2
(45) Date of Patent: Oct. 27, 2020

(54) DEVICE FOR MANAGING AT LEAST TWO LIGHT FUNCTIONS FOR A MOTOR VEHICLE

(71) Applicant: VALEO VISION BELGIQUE, Meslin l'Eveque (BE)

(72) Inventors: Yves Dubois, Meslin l'Eveque (BE); Alexandre Franc, Meslin l'Eveque (BE); Arthur Guillaume Renaudeau, Meslin l'Eveque (BE)

(73) Assignee: VALEO VISION BELGIQUE, Meslin l'Eveque (BE)

(*) Notice: Subject to any disclaimer, the term of this patent is extended or adjusted under 35 U.S.C. 154(b) by 0 days.

(21) Appl. No.: 16/667,988

(22) Filed: Oct. 30, 2019

(65) Prior Publication Data
US 2020/0130574 A1 Apr. 30, 2020

(30) Foreign Application Priority Data
Oct. 31, 2018 (FR) ...................... 18 60121

(51) Int. Cl.
*B60Q 1/14* (2006.01)
*B60Q 3/80* (2017.01)
(Continued)

(52) U.S. Cl.
CPC ............. *B60Q 3/80* (2017.02); *B60Q 1/2607* (2013.01); *B60Q 1/44* (2013.01); *B60Q 3/30* (2017.02);
(Continued)

(58) Field of Classification Search
CPC ...... B60Q 1/26; B60Q 1/2607; B60Q 1/2619; B60Q 1/2696; B60Q 1/46; B60Q 2400/30
See application file for complete search history.

(56) References Cited

U.S. PATENT DOCUMENTS

| 4,302,748 A | * | 11/1981 | Gant | ........................ | B60Q 1/46 340/471 |
| 4,380,753 A | * | 4/1983 | Gant | ........................ | B60Q 1/46 340/471 |

(Continued)

FOREIGN PATENT DOCUMENTS

| EP | 2 873 560 A2 | 5/2015 |
| EP | 3 025 908 A1 | 6/2016 |
| EP | 3 088 247 A1 | 11/2016 |

OTHER PUBLICATIONS

French Preliminary Search Report dated May 22, 2019 in French Application 18 60121 filed on Oct. 31, 2018 (with English Translation of Categories of Cited Documents).

*Primary Examiner* — Thuy Vinh Tran
(74) *Attorney, Agent, or Firm* — Oblon, McClelland, Maier & Neustadt, L.L.P.

(57) ABSTRACT

A device for managing at least two light functions accommodated in a same motor vehicle light device, the managing device comprising a block of light sources for each light function, wherein the managing device further comprises: an input block configured to: provide a power supply common to the at least two light functions; indicate if the at least two light functions are activated or deactivated; a bias block configured to supply a stabilized reference voltage common to the at least two light functions; a switching block for each light function, one switching block of which is configured to deactivate one of the at least two light functions that is defined as secondary with respect to the other of the at least two light functions that is defined as having priority if the latter is activated.

20 Claims, 7 Drawing Sheets

(51) Int. Cl.
*B60Q 3/30* (2017.01)
*H05B 45/46* (2020.01)
*B60Q 1/26* (2006.01)
*B60Q 1/44* (2006.01)
*F21W 103/35* (2018.01)
*F21W 103/20* (2018.01)
*F21S 43/14* (2018.01)
*F21W 103/55* (2018.01)
*F21W 107/10* (2018.01)
*B60Q 1/34* (2006.01)

(52) U.S. Cl.
CPC ............... *H05B 45/46* (2020.01); *B60Q 1/26* (2013.01); *B60Q 1/2619* (2013.01); *B60Q 1/2696* (2013.01); *B60Q 1/34* (2013.01); *B60Q 2400/30* (2013.01); *F21S 43/14* (2018.01); *F21W 2103/20* (2018.01); *F21W 2103/35* (2018.01); *F21W 2103/55* (2018.01); *F21W 2107/10* (2018.01)

(56) References Cited

U.S. PATENT DOCUMENTS

| | | | | |
|---|---|---|---|---|
| 4,891,625 | A * | 1/1990 | VanRiper | B60Q 1/2607 |
| | | | | 340/464 |
| 5,592,146 | A * | 1/1997 | Kover, Jr. | B60Q 1/143 |
| | | | | 307/10.8 |
| 2012/0229027 | A1 | 9/2012 | Huang | |
| 2015/0115795 | A1 | 4/2015 | Roger | |
| 2016/0318439 | A1 | 11/2016 | Levasseur | |
| 2017/0313244 | A1* | 11/2017 | Luciew | B60Q 3/62 |

* cited by examiner

DEVICE FOR MANAGING AT LEAST TWO LIGHT FUNCTIONS FOR A MOTOR VEHICLE

TECHNICAL FIELD OF THE INVENTION

The present invention relates to a device for managing at least two light functions.

It has a specific but nonlimiting use in motor vehicles of the pickup type.

TECHNOLOGICAL BACKGROUND OF THE INVENTION

In pickup-type motor vehicles, it is known to fit, at the rear of a driver cab of these motor vehicles including a transporting rear outer area, for example intended for transporting goods, a stop lamp, known by the acronym CHMSL meaning "Central High Mounted Stop Lamp", and load lamps, also called cargo lamps. The stop lamp makes it possible for the motor vehicle to signal during specific manoeuvres, and the cargo lamps make it possible to light up the aforementioned transporting rear outer area.

The stop lamp is in a central position according to the transverse direction of the motor vehicle. The load lamps are positioned on either side of this stop lamp according to the transverse direction of the motor vehicle. The stop lamp and the two loads lamps are accommodated in a same light device. A rotating button is used to activate the cargo function. Thus, thanks to the stop lamp and to the two cargo lamps, a light function called stop function and a light function called cargo function are achieved.

The disadvantage of this prior art is that, to achieve the stop function and the cargo function, it is necessary to have three separate managing devices on three separate printed circuit boards and three different power supplies for said stop lamp and said cargo lamps, which results is using a large number of components and a cost in terms of assembly time.

In this context, the aim of the present invention is to propose a device for managing at least two light functions accommodated in a same motor vehicle light device which makes it possible to solve the aforementioned disadvantage.

GENERAL DESCRIPTION OF THE INVENTION

To this end, the invention proposes a device for managing at least two light functions accommodated in a same motor vehicle light device, said managing device comprising a block of light sources for each light function, characterized in that said managing device further comprises:
  an input block configured to:
    provide a power supply common to said at least two light functions;
    indicate if said at least two light functions are activated or deactivated;
  a bias block configured to supply a stabilized reference voltage common to said at least two light functions;
  a switching block for each light function, one switching block of which is configured to deactivate one of said at least two light functions that is defined as secondary with respect to the other of said at least two light functions that is defined as having priority if the latter is activated.

Thus, thanks to the single managing device for the two light functions such as the stop function and the cargo function, it is possible to reduce the number of components that are used to achieve the stop and cargo functions and consequently the assembly time.

According to nonlimiting embodiments, said managing device can further include one or more additional features taken separately or according to all technically possible combinations, from the following:

According to one nonlimiting embodiment, said input block comprises an input point associated with each light function and configured to receive an activating/deactivating signal for each light function.

According to a nonlimiting embodiment, said input block further comprises:
  a common power supply for said at least two light functions;
  an output point for each light function, and configured to be in a first logic state or in a second logic state such as to indicate if said light function is activated or deactivated.

According to a nonlimiting embodiment, one of the switching blocks comprises:
  a resistor connected to an output point of the input block, said output point being that of one of said at least two light functions;
  an input point linked to said output point via the resistor.

According to a nonlimiting embodiment, the other of the switching blocks comprises a tertiary transistor configured to:
  short-circuit the power supply of one of said at least two light functions when the other of said at least two light functions that is defined as having priority is activated.

According to a nonlimiting embodiment, the other of the switching blocks further comprises:
  an input point linked to an output point of the input block via said tertiary transistor, said output point being that of the other of said at least two light functions.

According to a nonlimiting embodiment, one of the switching blocks comprises a primary control transistor configured to control the power supply of one of said at least two light functions, and the other switching block comprises a secondary control transistor configured to control the power supply of the other of said at least two light functions.

According to a nonlimiting embodiment, said input block is common to said at least two light functions.

According to a nonlimiting embodiment, said bias block is common to said at least two light functions.

According to a nonlimiting embodiment, said input block, said bias block, and said switching blocks are arranged on a same printed circuit board.

According to a nonlimiting embodiment, said input block, said bias block, said switching blocks, and at least one block of light sources are arranged on a same printed circuit board.

According to a nonlimiting embodiment, a first light function is a raised stop lamp function and a second light function is a cargo function.

According to a nonlimiting embodiment, a first light function is a flashing lamp function and a second light function is a daytime running lamp function.

According to a nonlimiting embodiment, a first light function is a flashing lamp function and a second light function is a light mat function.

According to a nonlimiting embodiment, said managing device is configured to manage more than two light functions.

BRIEF DESCRIPTION OF THE FIGURES

The invention and the various uses thereof will be better understood upon reading the following description and with reference to the appended figures.

DESCRIPTION OF EMBODIMENTS OF THE INVENTION

The elements that are identical, by structure or by function, appearing in the various figures retain the same references, unless specified to the contrary.

The device 10 for managing at least two light functions F1, F2 for a motor vehicle according to the invention is described with reference to FIGS. 1 to 8.

Motor vehicle means any type of motorized vehicle.

Figure 1:
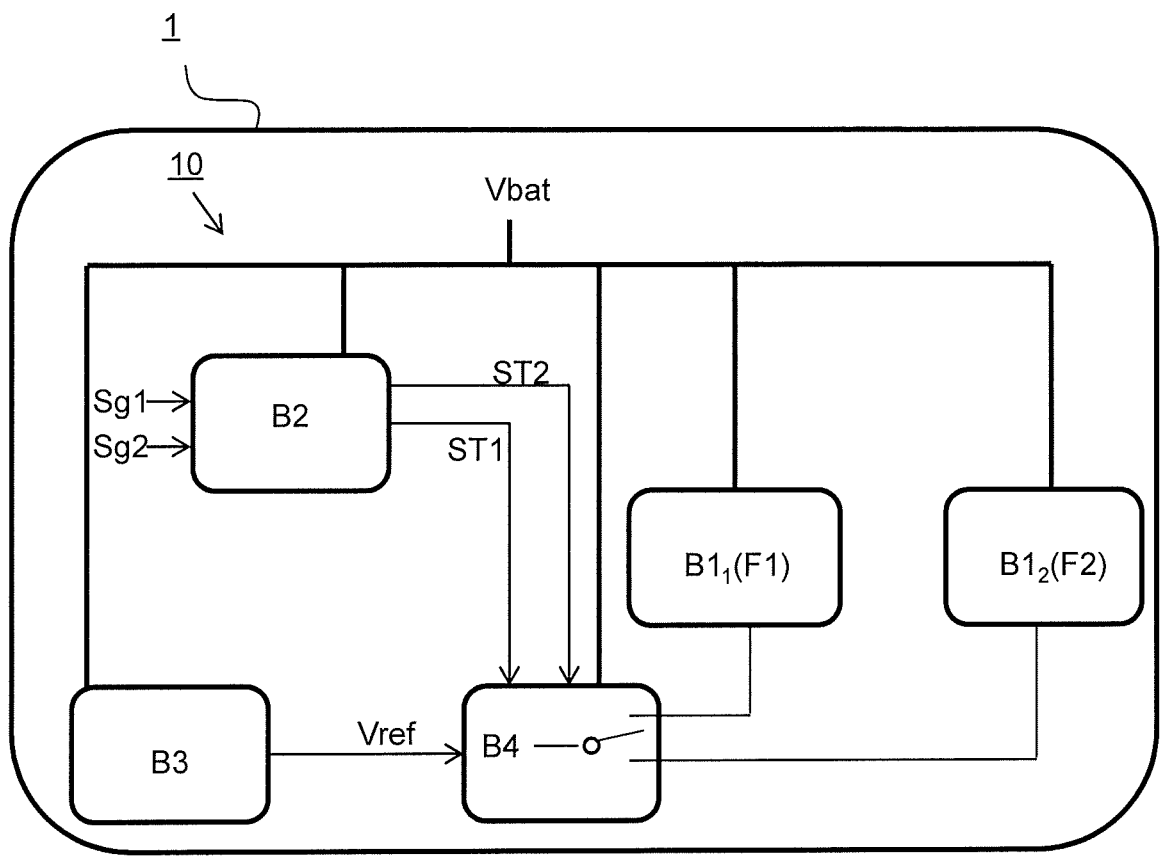
FIG. 1 represents a block diagram of a device for managing at least two light functions accommodated in a same light device, according to a nonlimiting embodiment of the invention.
Figure 2:
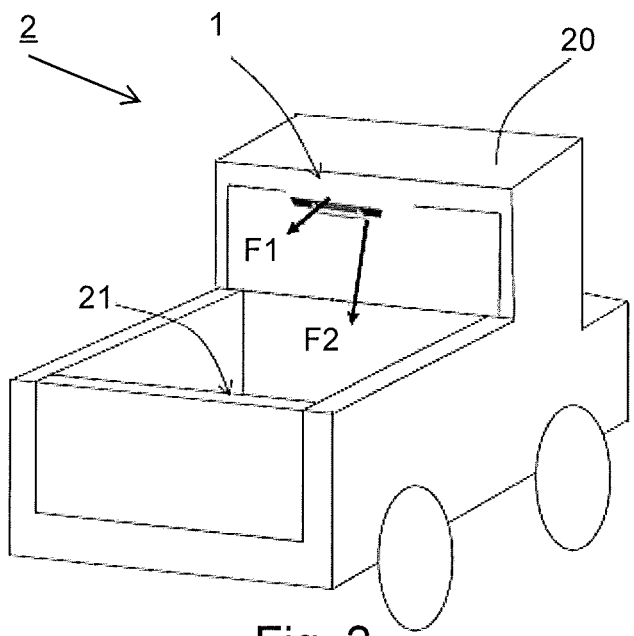
FIG. 2 is a perspective schematic view of a motor vehicle provided with a light device comprising the managing device of FIG. 1, according to a nonlimiting embodiment.

The managing device 10 is part of a light device 1 illustrated in FIGS. 1 and 2.

The light device 1 is configured to carry out two light functions F1, F2.

In a nonlimiting embodiment, a first light function F1 is a raised stop lamp function, known by the acronym CHMSL meaning "Central High Mounted Stop Lamp", otherwise called stop function, and the second light function F2 is a load lamp function, otherwise called cargo function.

The first light function F1 is defined as having priority.

The second light function F2 is defined as secondary.

As illustrated in FIG. 2, in a nonlimiting embodiment, the light device 1 is fitted at the rear upper part and in a central position of a driver cab 20 of the motor vehicle 2 which comprises a transporting rear outer area 21, otherwise called open carrier 21.

In the light device 1, the stop lamp is in the central position according to the transverse direction of the vehicle, and the load lamps, otherwise called cargo lamps, are arranged on either side of this stop lamp according to the transverse direction of the vehicle.

As a reminder, the longitudinal direction of the vehicle in this case is the main direction of elongation of the latter, which is also called the main direction in which this motor vehicle 2 moves over the road. The transverse direction of the motor vehicle, substantially perpendicular to the aforementioned longitudinal direction, defines, with the latter, a plane that is substantially parallel to that of the road on which the motor vehicle is located, and the vertical direction of the motor vehicle is the direction perpendicular to the longitudinal direction and to the transverse direction of the motor vehicle defining, with these, a right-handed trihedron.

The stop lamp is configured to act as a signal for the motor vehicle 2 and/or one of the manoeuvres thereof to the other road users and must be visible from the longest possible distance, substantially in the direction of the road: this involves the use of one or more light beams, firstly, directed substantially in the longitudinal direction of the motor vehicle, i.e. the direction of movement of the latter, and secondly, orientated as parallel as possible to the surface of the road on which the motor vehicle moves. For these reasons, it is known to install such a stop lamp at the rear of a driver cab of such a vehicle, preferentially in the central position of this cab and at the upper part of the latter such as to obtain maximum visibility.

Conversely, the cargo lamps must provide, in the transporting rear outer area 21 of the motor vehicle 2, powerful lighting covering a maximum surface of this transport area, in order to allow, for example, good visibility during the loading of goods, or a complete-as-possible check of the transporting rear outer area 21, once the goods have been placed therein. For these reasons, the transporting rear outer area 21 is located below a driver station of the vehicle according to the vertical direction of the latter, the light beams intended for the cargo lamps are directed, according to the vertical direction of the vehicle, downward, and are oriented such that the light beam or beams that they emit reach, as far as possible, all corners of the transporting volume.

As illustrated in FIG. 1, the managing device 10 comprises:
- a block of light sources B1 for each light function F1, F2, referenced as $B1_1$ and $B1_2$, respectively;
- an input block B2;
- a bias block B3;
- a switching block B4 for each light function F1, F2.

In a first nonlimiting embodiment, the input block B2, the bias block B3, and the switching blocks B4 are arranged on a same printed circuit board PCBA, otherwise called PCBA board and known by the term "Printed Circuit Board Assembly".

The blocks of light sources $B1_1$ and $B1_2$ are arranged on separate printed circuit boards PCBA.

In a second nonlimiting embodiment, the input block B2, the bias block B3, the switching blocks B4, and at least one block of light sources B1 are arranged on a same printed circuit board PCBA. In a nonlimiting alternative embodiment, the two blocks of light sources $B1_1$ and $B1_2$ are arranged on the same printed circuit board PCBA as the input block B2, the bias block B3, and the switching blocks B4.

These various blocks are described in detail hereafter.

In the rest of the description, the raised stop lamp function, otherwise called CHMSL function, is taken as a nonlimiting example of a first light function F1, and the load lamp function is taken as a nonlimiting example of a second light function F2.

Blocks of Light Sources B1

Figure 3:
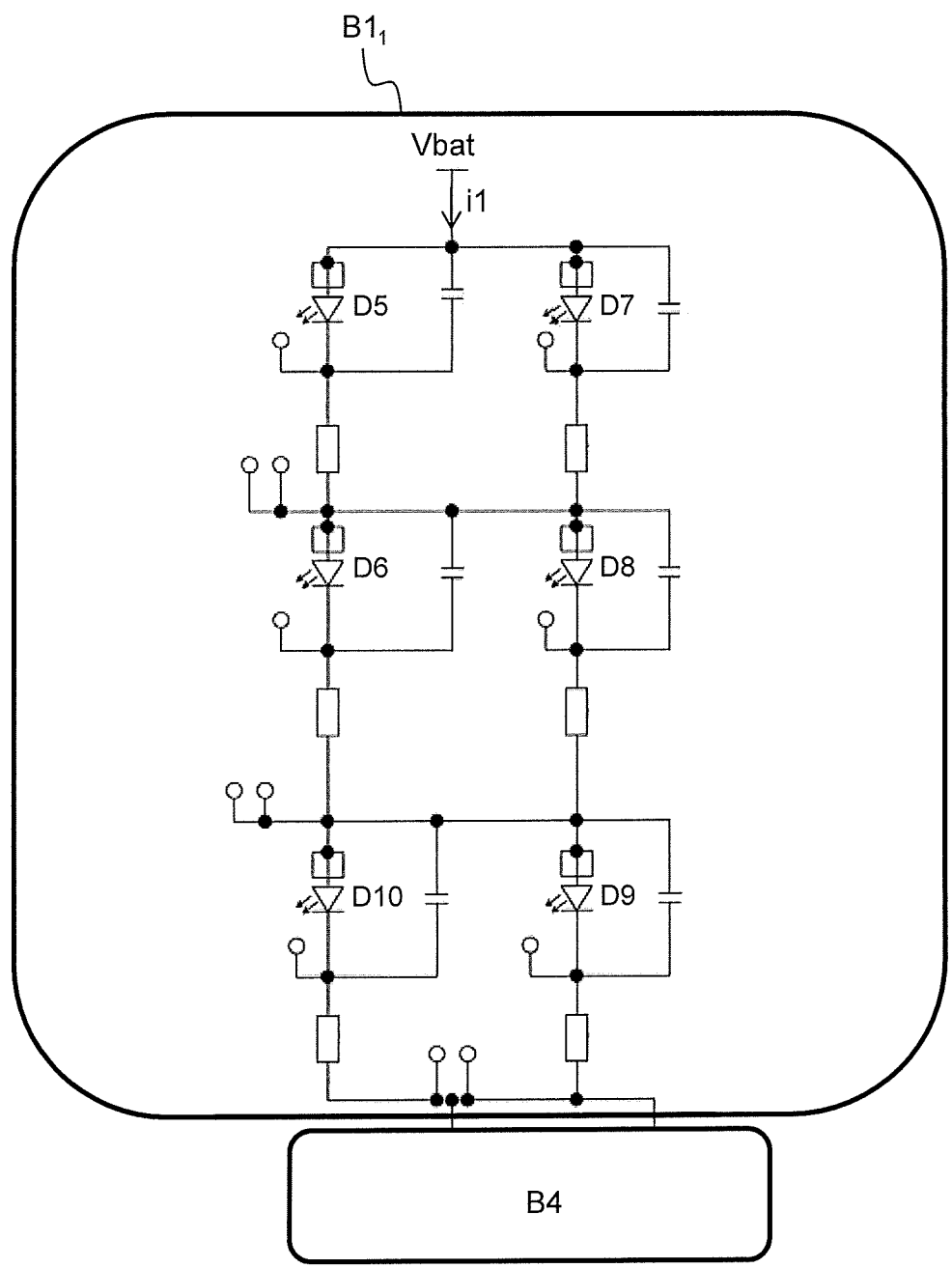
FIG. 3 represents a diagram of a first block of light sources of the managing device of FIG. 1, according to a nonlimiting embodiment.
Figure 4:
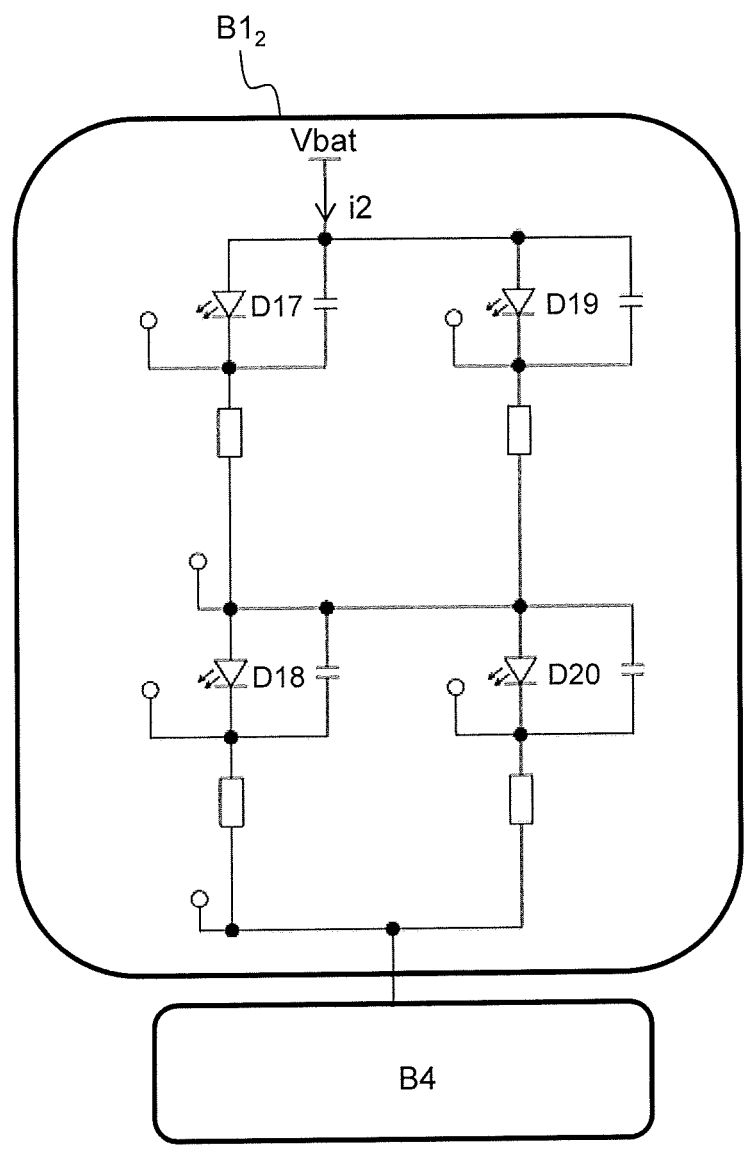
FIG. 4 represents a diagram of a second block of light sources of the managing device of FIG. 1, according to a nonlimiting embodiment.

The blocks of light sources B1 are illustrated in FIGS. 1, 3 and 4.

For each light function F1, F2, the managing device 10 comprises a block of light sources B1. Thus, in the nonlimiting example of FIG. 1, a first block of light sources $B1_1$ is associated with the CHMSL function, whereas a second block of light sources $B1_2$ is associated with the cargo function.

In a nonlimiting example, the first block of light sources $B1_1$ comprises six light sources D5 to D10 (FIG. 3), and the second block of light sources $B1_2$ comprises four light sources D17 to D20 (FIG. 4).

In a nonlimiting embodiment, a light source D is a semiconductor light source.

In a nonlimiting embodiment, the semiconductor light source is part of a light-emitting diode.

Light-emitting diodes means any type of light-emitting diodes, for instance nonlimiting examples of LEDs (light-emitting diode), OLEDs (organic LED), AMOLEDs (active matrix organic LED), or FOLEDs (flexible OLED).

Since such blocks of light sources are well known to a person skilled in the art, they are not described in greater detail.

Input Block B2

Figure 5:
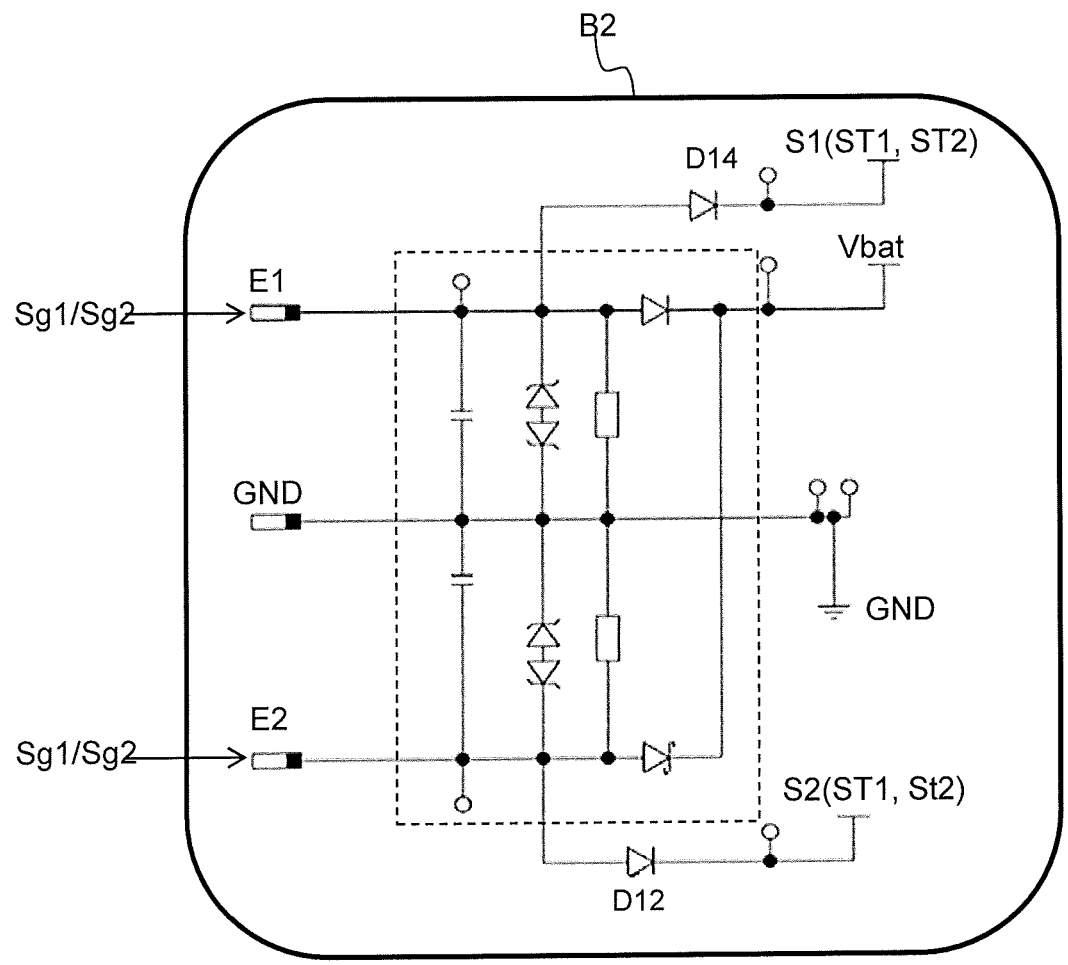
FIG. 5 represents a diagram of an input block of the managing device of FIG. 1, according to a nonlimiting embodiment.

The input block is illustrated in FIGS. 1 and 5.

The input block B2 is common to both light functions F1, F2. This makes it possible to reduce the number of components and the cost.

The input block B2 is configured to:
  provide a power supply Vbat common to said at least two light functions F1, F2;
  indicate if said at least two light functions F1, F2 are activated or deactivated.

To this end, as illustrated in FIG. 5, the input block B2 comprises:
  a common power supply Vbat for said at least two light functions F1, F2;
  an output point S1, S2 for each light function F1, F2 and configured to be in a first logic state ST1 or in a second logic state ST2 such as to indicate if said light function F1, F2 is activated or deactivated.

The output point S1 is otherwise called first output point S1.

The output point S2 is otherwise called second output point S2.

In another nonlimiting embodiment, the first logic state ST1 is a weak control current.

In a nonlimiting embodiment, the second logic state ST2 is a weak control current.

In a nonlimiting embodiment, the common power supply Vbat is a voltage of between 4 and 7 volts.

In a nonlimiting embodiment, a diode D14 and D12 is joined to each output point S1, S2, respectively.

Moreover, as illustrated in FIG. 5, the input block B2 comprises:
  an input point E1, E2 associated with each light function F1, F2 and configured to receive an activation/deactivation signal Sg1, Sg2 for each light function F1, F2.

The input point E1 is otherwise called first input point E1.

The input point E2 is otherwise called second input point E2.

In a nonlimiting embodiment, the first input point E1 is joined to the brakes of the motor vehicle 2.

Thus, when the driver of the motor vehicle 2 brakes, the driver presses on the brake pedal, and the latter is then in a pushed-in position. The stop function is then activated. A central electronic unit (not illustrated) of the motor vehicle 2 sends an activation signal Sg1 to the first input point E1 when the brake pedal is in a pushed-in position. Conversely, when the driver lifts the foot thereof from the brake pedal, the latter is no longer in a pushed-in position, but in a released position, and the stop function is then deactivated. The central electronic unit sends a deactivation signal Sg2 to the first input point E1 when the brake pedal is in a released position.

When the activation signal Sg1 reaches the diode D14, the latter switches the output point S1 into the first logic state ST1. When the deactivation signal Sg2 reaches the diode D14, the latter switches the output point S1 into the second logic state ST2.

In a nonlimiting embodiment, the second input point E2 is joined to a rotating button, in the passenger compartment of the motor vehicle 2, used to activate the cargo function. Thus, when the user of the motor vehicle 2 turns the rotating button in one direction as far as a first position, the cargo function is then activated. The central electronic unit of the motor vehicle 2 sends an activation signal Sg1 to the second input point E2. Conversely, when the user of the motor vehicle 2 turns the rotating button in the opposite direction as far as an initial position, the cargo function is then deactivated.

The central electronic unit thus sends a deactivation signal Sg2 to the second input point E2.

When the activation signal Sg1 reaches the diode D12, the latter switches the output point S2 into the first logic state ST1.

When the deactivation signal Sg2 reaches the diode D12, the latter switches the output point S2 into the second logic state ST2.

In a nonlimiting embodiment, the input block B2 further comprises a common earth GND for said at least two light functions F1, F2. Thus, the common earth GND is the earth of the board PCBA.

It shall be noted that the output point S1 of the input block B2 is an input point for one of the switching blocks B4 described later.

It shall be noted that the output point S2 of the input block B2 is an input point for the other of the switching blocks B4 described later.

Bias Block B3

Figure 6:
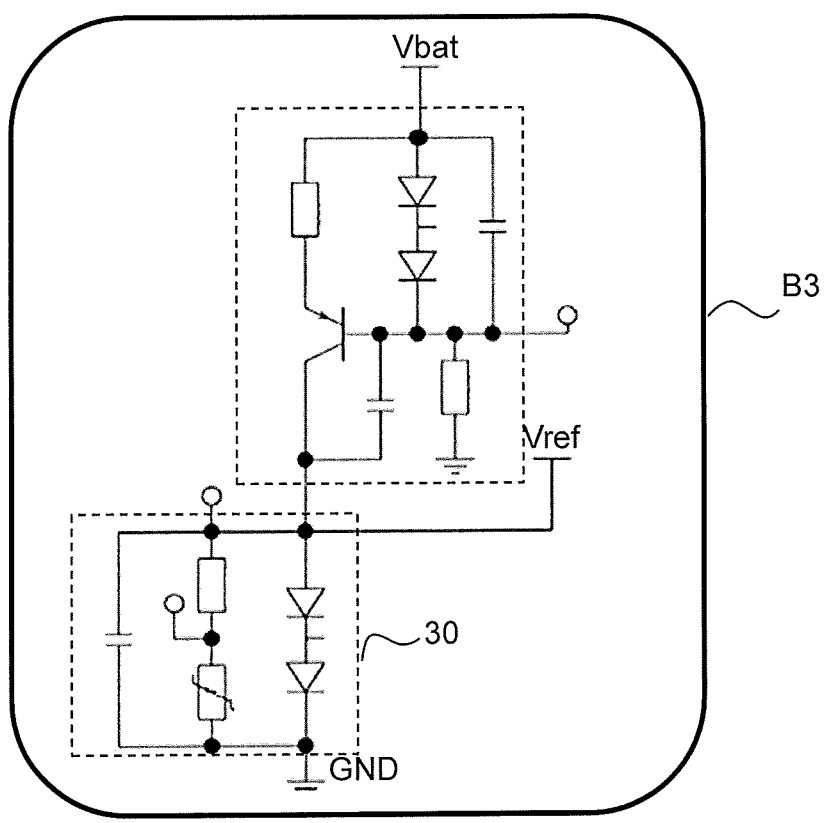
FIG. 6 represents a diagram of a bias block of the managing device of FIG. 1, according to a nonlimiting embodiment.

The bias block B3 is illustrated in FIGS. 1 and 6.

It is configured to supply a stabilized reference voltage Vref common to said at least two light functions F1, F2.

The bias block B3 is common to said at least two light functions F1, F2.

In a nonlimiting embodiment, the stabilized reference voltage Vref is between 1.6 V and 3 V.

The common power supply Vbat powers a regulating circuit 30 for establishing the stabilized reference voltage Vref. The regulating circuit 30 makes it possible to reduce the voltage Vbat and stabilize it with respect to the reference voltage Vref.

This stabilized reference voltage Vref is configured to power the primary control transistor Q6 and the secondary control transistor Q10 of the switching block B4, which control the power supply for the light functions F1 and F2, respectively. When the output points S1 and/or S2 are in the first logic state ST1 which indicates that the light functions F1, F2, respectively, are activated, then the latter are powered by the stabilized reference voltage Vref.

Switching Block B4

Figure 7:
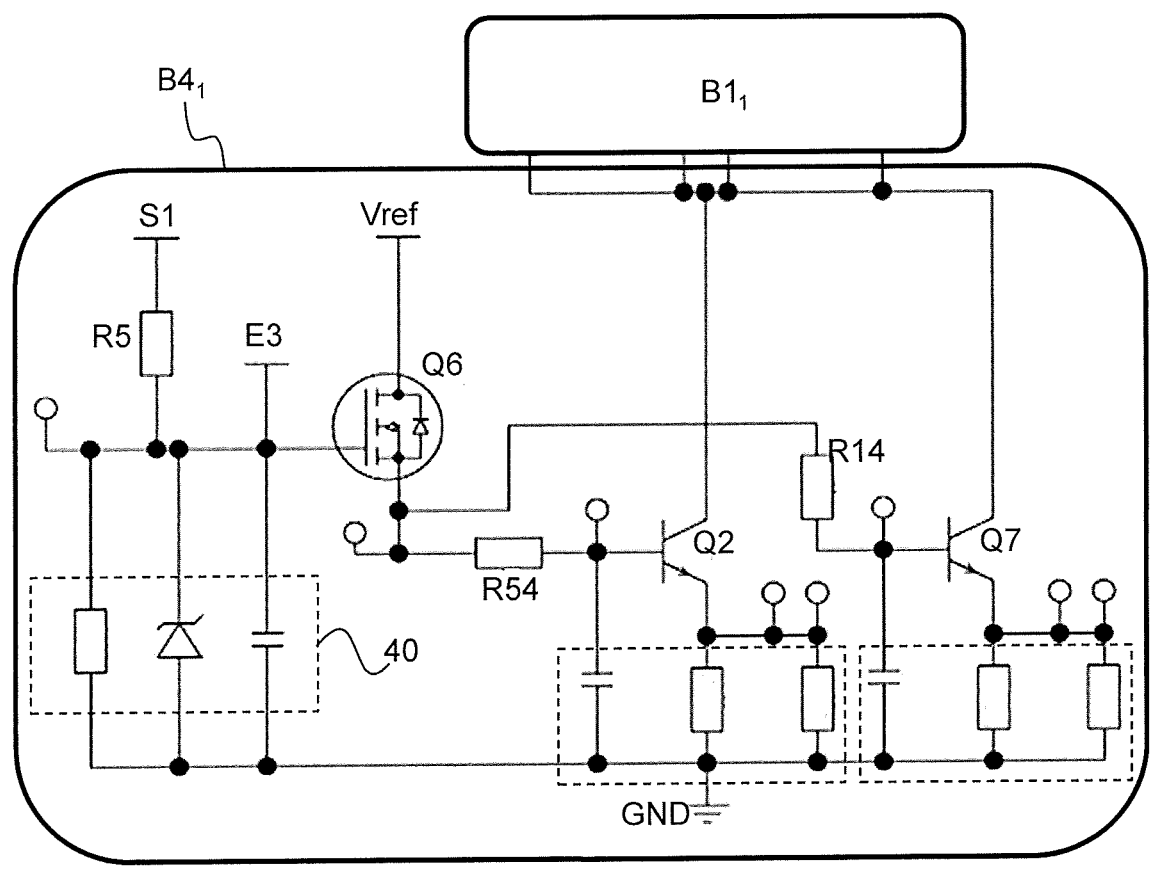
FIG. 7 represents a diagram of a first switching block of the managing device of FIG. 1, according to a nonlimiting embodiment.
Figure 8:
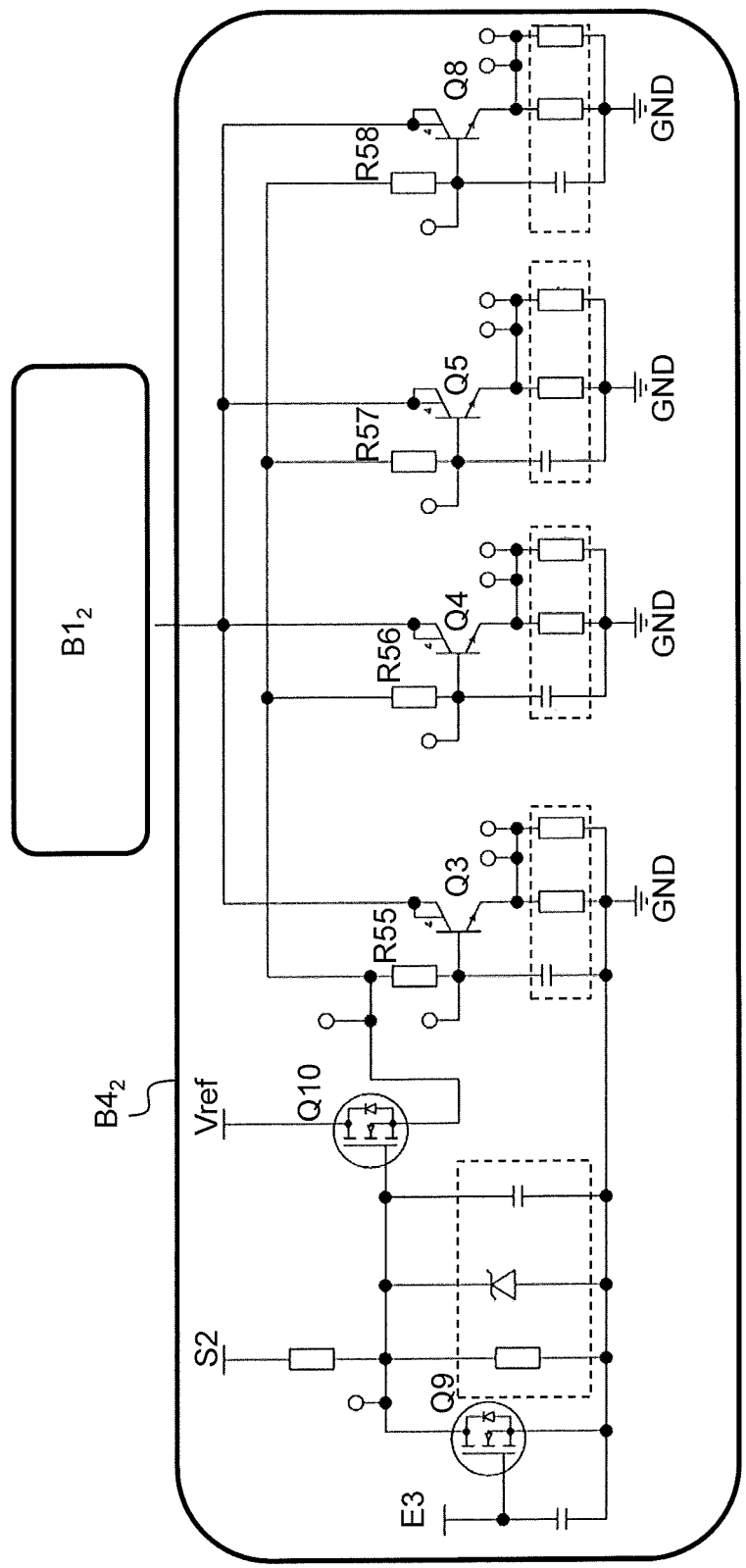
FIG. 8 represents a diagram of a second switching block of the managing device of FIG. 1, according to a nonlimiting embodiment.

The switching blocks B4 are illustrated in FIGS. 1, 7 and 8.

The switching block B4, otherwise called first switching block, illustrated in FIG. 7 is associated with the light function F1. It is referenced as $B4_1$.

It shall be noted that each switching block B4 is configured to provide the power necessary to power the block of light sources $B1_1$ and $B1_2$, respectively, which power is different from one block of light sources $B1_1$ to the other $B1_2$.

The switching block B4, otherwise called second switching block, illustrated in FIG. 8 is associated with the light function F2. It is referenced as $B4_2$.

In a nonlimiting embodiment, the switching block $B4_1$ illustrated in FIG. 7, comprises:

a primary control transistor Q6 configured to control the power supply of one F1 of said at least two light functions F1, F2.

In a nonlimiting embodiment, the switching block B4$_2$ illustrated in FIG. 8, comprises:

a secondary control transistor Q10 configured to control the power supply of the other F2 of said at least two light functions F1, F2.

In particular, the primary control transistor Q6 is configured to control the power supply of the stop function which has priority, and the secondary control transistor Q10 is configured to control the power supply of the cargo function which is secondary.

To this end, in a nonlimiting embodiment, the primary transistor Q6 is connected to the output point S1 of the light function F1, and the secondary transistor Q10 is connected to the output point S2 of the light function F2.

It shall be noted that the stop function must respect regulations and not exceed a maximum intensity of 110 candela, while the cargo function does not have this restriction.

To this end, in a nonlimiting embodiment, the power supply of the light functions F1 and F2 can be adjusted by means of at least one adjustable resistor connected to the primary control transistor Q6 for the light function F1, and by means of a least one adjustable resistor connected to the secondary control transistor Q10. Thus, this makes it possible to obtain different light intensities for the light functions F1, F2.

In a nonlimiting example illustrated in FIG. 7, the power supply of the light function F1 can be adjusted by means of two adjustable resistors R54 and R14.

In a nonlimiting example illustrated in FIG. 8, the power supply of the light function F2 can be adjusted by means of four adjustable resistors R55 to R58.

In a nonlimiting embodiment, each switching block B4 further comprises at least one power transistor connected to the control transistor thereof via said at least one adjustable resistor.

In the nonlimiting example illustrated in FIG. 7, the switching block B4$_1$ comprises:

two primary power transistors Q2, Q7 connected to the primary control transistor Q6 via the adjustable resistors R54 and R14, respectively.

In the nonlimiting example illustrated in FIG. 8, the switching block B4$_2$ comprises:

four secondary power transistors Q3, 04, 05 and 08 connected to the secondary control transistor Q10 via the adjustable resistors R55, R56, R57 and R58, respectively.

Thus, when the primary control transistor Q6 receives the first logic state ST1 of the output point S1, it closes and thus allows the stabilized reference voltage Vref to generate a current necessary to close the primary power transistors Q2 and Q7 allowing the flow of a supply current i1 (illustrated in FIG. 3) necessary to power the block of light sources B1$_1$. The supply current i1 is generated by the common power supply Vbat.

Thus, when the secondary control transistor Q10 receives the first logic state ST1 of the output point S2, it closes and thus allows the stabilized reference voltage Vref to generate a current necessary to close the secondary power transistors Q3, Q4, Q5 and Q8 allowing the flow of a supply current i2 necessary to power the block of light sources B1$_2$. The supply current i2 is generated by the common power supply Vbat.

In a nonlimiting embodiment, the switching block B4$_1$ further comprises a resistor R5 connected to the output point S1 of the light function F1. This makes it possible to have a weak current exiting the output point S1. Thus, in the case of short circuit in the input block B2, the switching block B4 is not damaged.

In a nonlimiting embodiment illustrated in FIG. 7, the switching block B4$_1$ further comprises an input point E3 linked to:

the output point S1 of the input block B2 via said resistor R5, the output point S1 being that of the light function F1; and the primary control transistor Q6.

In a nonlimiting embodiment illustrated in FIG. 8, the switching block B4$_2$ further comprises an input point E3 linked to:

the output point S2 of the input block B2 via a tertiary transistor Q9, the output point S2 being that of the light function F2.

The input point E3 is otherwise called third input point E3. The input point E3 is configured to be in the same logic state ST1, ST2 as the output point S1 apart from the variable corresponding to the resistor R5.

One of the switching blocks B4 is configured to deactivate one of said at least two light functions F2 that is defined as secondary with respect to the other of said at least two light functions F1 defined as having priority if the latter is activated. This is the switching block B4$_2$.

Thanks to the input point E3:

an indication is given if the light function F1 is activated/deactivated in order to switch on the light sources of the block of light sources B1$_1$ but also to switch off the light sources of the block of light sources B1$_2$ if the light sources of the block of light sources B1$_1$ are switched on, as described hereafter;

together with the resistor R5, a weaker current is obtained for commanding the primary control transistor Q6.

In a nonlimiting embodiment illustrated in FIG. 8, the switching block B4$_2$ thus further comprises the tertiary transistor Q9. The tertiary transistor Q9 is linked to the earth GND, to the output point S2 and to the input point E3.

The tertiary transistor Q9 is configured to:

short-circuit the power supply of the light function F2 of said at least two light functions F1, F2 when the other F1 of said at least two light functions F1 that is defined as having priority is activated.

Thus, the tertiary transistor Q9 short-circuits the power supply of the cargo function when the stop function which has priority is switched on.

Since the tertiary transistor Q9 is linked to the input point E3, it receives the first logic state ST1 (with the exception of the variable corresponding to the resistor R5) when the light function F1 is activated, and the second logic state ST2 when the light function F1 is switched off.

When it receives the first logic state ST1 (with the exception of the variable corresponding to the resistor R5), the tertiary transistor Q9 closes. This creates a short circuit at the terminals thereof. Since it is linked to the earth GND, the weak current corresponding to the first logic state ST1 which is found on the output point S2 flows via the resulting short circuit towards the earth GND. It no longer powers the control transistor Q10. The block of light sources B1$_2$ is no longer powered. As a result, the light sources of said block of light sources B1$_2$ are switched off if they were switched on.

Thus, in the nonlimiting example of the stop function and of the cargo function, when the driver brakes while the cargo lamps are switched on, the stop lamp is switched on and the cargo lamps will switch off, automatically. The stop lamp in this case has priority with respect to the cargo lamps. Thus, in this case the statutory light function (the stop function) is prioritized with respect to the courtesy light function (the cargo function).

Of course, the description of the invention is not limited to the embodiments described above.

Thus, in a nonlimiting embodiment, the managing device 10 manages more than two light functions.

Thus, in another nonlimiting embodiment, the stop function can be replaced by another statutory function, such as, in a nonlimiting example, a flashing lamp function TI called "Turn Indicator", and the cargo function can be replaced by another courtesy function, such as, in a nonlimiting example, a light mat function. This light mat function makes it possible to project a light pattern on the ground entirely around the motor vehicle 2.

Thus, in another nonlimiting embodiment, the stop function can be replaced by another statutory function, such as, in a nonlimiting example, a flashing lamp function TI, and the cargo function can be replaced by a statutory function, such as, in a nonlimiting example, a daytime running lamp DRL.

Thus, in another nonlimiting embodiment, the second input point E2 is associated with the open carrier 21 of the motor vehicle being opened, which is used to activate the cargo function. When the open carrier is opened, with the engine switched off, then the second input point E2 receives an activation signal Sg1 for the cargo function. The second input point E2 can thus be associated with the opening of the open carrier of the motor vehicle (engine switched off), and/or with the rotating button (engine running).

Thus, the described invention particularly has the following advantages:

- it allows the number of components to be reduced;
- it allows the assembly time for the components of the managing device 10 to be optimized;
- it allows the costs of the managing device 10 to be reduced;
- it allows a light function F1 to be prioritized with respect to another F2;
- it allows for a single power supply Vbat for the light functions F1, F2;
- it allows for a single stabilized reference voltage Vref for the light functions F1, F2;
- it allows for a single bias block B3 for the two light functions F1, F2;
- it allows for a single input block B2 for the two light functions F1, F2.

The invention claimed is:

1. A device for managing at least two light functions accommodated in a same motor vehicle light device, the managing device comprising:
    a block of light sources for each light function;
    an input block that includes a common power supply that generates a common power voltage, the input block configured to:
       provide the common power voltage from the common power supply to the at least two light functions, and indicate if the at least two light functions are activated or deactivated;
    a bias block configured to receive the common power voltage that powers a regulating circuit included in the bias block, the regulating circuit configured to generate a stabilized reference voltage from the common power voltage, the bias block configured to supply the stabilized reference voltage to the at least two light functions; and
    a switching block for each light function, one switching block of which is configured to deactivate one of the at least two light functions that is defined as secondary with respect to the other of the at least two light functions that is defined as having priority if the latter is activated.

2. The device according to claim 1, wherein the input block comprises an input terminal associated with each light function and configured to receive an activating/deactivating signal for each light function.

3. The device according to claim 2, wherein the input block further comprises:
    an output terminal for each light function, and configured to be in a first logic state or in a second logic state such as to indicate if the light function is activated or deactivated.

4. The device according to claim 2, wherein the other of the switching blocks comprises a tertiary transistor configured to:
    short-circuit a supply of the common power voltage to one of the at least two light functions when the other of the at least two light functions that is defined as having priority is activated.

5. The device according to claim 2, wherein one of the switching blocks comprises a primary control transistor configured to control a supply of the common power voltage to one of the at least two light functions, and the other switching block comprises a secondary control transistor configured to control a supply of the common power voltage to the other of the at least two light functions.

6. The device according to claim 2, wherein the input block is common to the at least two light functions.

7. The device according to claim 2, wherein the bias block is common to the at least two light functions.

8. The device according to claim 1, wherein the input block comprises:
    an output terminal for each light function, and configured to be in a first logic state or in a second logic state such as to indicate if the light function is activated or deactivated.

9. The device as claimed in claim 8, wherein one of the switching blocks comprises:
    a resistor connected to an output terminal of the input block, the output terminal being that of one of the at least two light functions, and
    an input terminal linked to the output terminal via the resistor.

10. The device according to claim 1, wherein the other of the switching blocks comprises a tertiary transistor configured to:
    short-circuit a supply of the common power voltage to one of the at least two light functions when the other of the at least two light functions that is defined as having priority is activated.

11. The device according to claim 10, wherein the other of the switching blocks further comprises:
    an input terminal linked to an output terminal of the input block via the tertiary transistor, the output terminal being that of the other of the at least two light functions.

12. The device according to claim 1, wherein one of the switching blocks comprises a primary control transistor configured to control a supply of the common power voltage to one of the at least two light functions, and the other switching block comprises a secondary control transistor configured to control a supply of the common power voltage to the other of the at least two light functions.

13. The device according to claim 1, wherein the input block is common to the at least two light functions.

14. The device according to claim 1, wherein the bias block is common to the at least two light functions.

15. The device according to claim 1, wherein the input block, the bias block, and the switching blocks are arranged on a same printed circuit board.

16. The device according to claim 1, wherein the input block, the bias block, the switching blocks, and at least one block of light sources are arranged on a same printed circuit board.

17. The device according to claim 1, wherein a first light function is a raised stop lamp function and a second light function is a cargo function.

18. The device according to claim 1, wherein a first light function is a flashing lamp function and a second light function is a daytime running lamp function.

19. The device according to claim 1, wherein a first light function is a flashing lamp function and a second light function is a light mat function.

20. The device according to claim 1, wherein the managing device is configured to manage more than two light functions.

\* \* \* \* \*